(12) United States Patent
Damke et al.

(10) Patent No.: US 12,545,691 B2
(45) Date of Patent: *Feb. 10, 2026

(54) TERTIARY HYDROXYL FUNCTIONAL ALKOXYSILANES AND METHODS FOR PREPARING THEREOF

(71) Applicant: Henkel AG & Co. KGaA, Duesseldorf (DE)

(72) Inventors: Jan-Erik Damke, Duesseldorf (DE); Johann Klein, Duesseldorf (DE); Rok Brisar, Rostock (DE); Esteban Mejia, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 645 days.

This patent is subject to a terminal disclaimer.

(21) Appl. No.: 17/813,687

(22) Filed: Jul. 20, 2022

(65) Prior Publication Data
US 2022/0363699 A1   Nov. 17, 2022

Related U.S. Application Data

(60) Division of application No. 16/898,579, filed on Jun. 11, 2020, now abandoned, which is a continuation of application No. PCT/EP2018/083721, filed on Dec. 6, 2018.

(30) Foreign Application Priority Data

Dec. 12, 2017   (EP) ..................... 17206708

(51) Int. Cl.
C07F 7/18   (2006.01)
C08L 101/02   (2006.01)

(52) U.S. Cl.
CPC .......... C07F 7/1892 (2013.01); C08L 101/02 (2013.01)

(58) Field of Classification Search
CPC ............................. C07F 7/1892; C07F 7/1804
See application file for complete search history.

(56) References Cited

U.S. PATENT DOCUMENTS

| | | | | |
|---|---|---|---|---|
| 4,997,965 A | * | 3/1991 | Lohmann | B01J 20/29 556/427 |
| 8,609,800 B2 | | 12/2013 | Boudet et al. | |
| 9,765,177 B2 | | 9/2017 | Kramer et al. | |
| 9,790,315 B2 | | 10/2017 | Kramer et al. | |
| 11,560,445 B2 | * | 1/2023 | Damke | C08G 18/10 |
| 2015/0126678 A1 | * | 5/2015 | Kramer | C08G 18/10 556/419 |

FOREIGN PATENT DOCUMENTS

| | | |
|---|---|---|
| EP | 0375611 A1 | 6/1990 |
| EP | 2268650 B1 | 11/2012 |
| EP | 2832757 A1 | 2/2015 |
| EP | 2852649 B1 | 8/2017 |
| JP | 2014001152 A | 1/2014 |
| RU | 2456293 C1 | 7/2012 |
| WO | 2011081409 A2 | 7/2011 |

OTHER PUBLICATIONS

A. Basha, et al., 18 Tetrahedron letters, 4171-4172 (1977) (Year: 1977).*
Die Makromolekulare Chemie 1964, 73, 85-108 and Die Makromolekulare Chemie 1966, 97, 241-247.
Journal of the American Chemical Society, 2005, 127, 17644-17655.
Semenov et al (Ladilina, E. Y., Lyubova, T. S., Kuznetsova, O. V., Klapshin, Y. P., Baten'kin, M. A., Sidorenko, K. V., Glukhova, T. A., Gorshkov, O. N., Polymer Science Series B, 2015, 57, 150-158.
Yuya Tachibana, Xiangke Shi, Daniel Graiver, Ramani Narayan, Silicone, 4, 167-174.
International Search Report for International PCT Patent Application No. PCT/EP2018/083721 dated Jan. 31, 2019.

* cited by examiner

Primary Examiner — Alexander R Pagano
Assistant Examiner — Frank S. Hou
(74) Attorney, Agent, or Firm — Mary K. Cameron

(57) ABSTRACT

Disclosed is a tertiary hydroxyl functional alkoxysilane of the general formula (I)

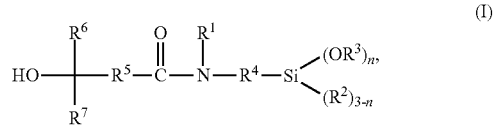

wherein $R^1$ is selected from the group consisting of hydrogen and a linear or branched, substituted or unsubstituted hydrocarbon residue having 1 to 20 carbon atoms; $R^2$ and $R^3$ are same or different and are, independent from one another, selected from a linear or branched, substituted or unsubstituted hydrocarbon residue having 1 to 20 carbon atoms; $R^4$ is selected from a linear or branched, substituted or unsubstituted hydrocarbon residue having 1 to 20 carbon atoms; $R^5$ is selected from a linear or branched, substituted or unsubstituted hydrocarbon residue having 1 to 20 carbon atoms; $R^6$ and $R^7$ are same or different and are, independent from one another, selected from a linear or branched, substituted or unsubstituted hydrocarbon residue having 1 to 20 carbon atoms; and n is 1, 2 or 3, a method for preparing thereof, and the use of the tertiary hydroxyl functional alkoxysilane of the general formula (I).

17 Claims, No Drawings

TERTIARY HYDROXYL FUNCTIONAL ALKOXYSILANES AND METHODS FOR PREPARING THEREOF

This application claims the benefit of U.S. patent application Ser. No. 16/898,579, filed Jun. 11, 2020, the contents of which are incorporated herein by reference in their entirety.

The present invention relates to a stable tertiary hydroxyl functional alkoxysilane and a method for preparing thereof. The present invention also relates to the use of the obtained hydroxyl functional alkoxysilane as an ingredient in adhesives, sealants and coatings, in construction, industrial applications or in consumer products.

One of the common silane agent for moisture-curable compositions is primary amine-functionalized alkoxysilanes, which are extremely reactive towards many electrophiles like for example: isocyanates, aldehydes and anhydrides. This makes them difficult to handle and store. Furthermore, fast and highly exothermic reactions impose processing and safety difficulties in the larger scale production of the prepolymers. High reaction rates also result in a low reaction selectivity and oligomerization.

The stability of the —OH group in the presence of alkoxysilanes is poor as was shown by many authors. Rossmy and Koerner were one of the first who showed the self-dealcoholization reaction undergone by OH-containing alkoxysilanes. They used this to their advantage in order to prepare cyclic alkoxysilanes (also called siloxacycloalkenes) (Die Makromolekulare Chemie 1964, 73, 85-108 and Die Makromolekulare Chemie 1966, 97, 241-247). They prepared primary hydroxyl functional alkoxysilanes by transesterification reaction, which formed 5- or 6-membered ring by eliminating alcohol. They propose that the primary alcohol is not stable in the presence of alkoxysilane and therefore tends to cyclize.

Trost and Ball (*Journal of the American Chemical Society*, 2005, 127, 17644-17655) investigated alkyne hydrosilylation catalyzed by a ruthenium catalyst. They also confirmed that secondary hydroxyl groups will perform alcohol exchange in the presence of alkoxysilanes, despite the fact that the secondary alcohol is less nucleophilic.

Tertiary hydroxyl functional fluorine containing alkoxysilanes were prepared by Semenov et al (Ladilina, E. Y., Lyubova, T. S., Kuznetsova, O. V., Klapshin, Y. P., Baten'kin, M. A., Sidorenko, K. V., Glukhova, T. A., Gorshkov, O. N., *Polymer Science Series B,* 2015, 57, 150-158). Aminoalkylalkoxysilane was reacted with hexafluoroacetone to obtain a tertiary alcohol, which was unstable in the presence of ethoxysilane. They showed that even the tertiary hydroxyl functionality can preform the self-dealcoholization reaction at ambient conditions. Prepared cyclic siloxacycloalkenes were used as a low reflective index coating for solar cells or similar, since the prepared polymers exhibit good thermal and mechanical stability and self-cleaning properties.

US 2007/0055036 A1 discloses the preparation of silane functional compound, which is synthesized by a hydrosilylation reaction of allylic alcohol and alkylalkoxysiliane. The self-dealcoholization reaction is induced by heating to produce cyclic silanes in high yields.

JP 2014001152 A describes the preparation of silane coupling agents for surface treatment applications. Epoxides are ring-opened by aminosilanes to produce —OH functional alkoxysilane as intermediates. Since the hydroxyl functionality is not stable, a siloxacycloalkene compound is formed as a final product.

Attempts to obtain hydroxyl functionalized silanes by reacting aminosilanes with epoxides are also disclosed in WO 2011/081409 A2. The compound is prepared by a reaction of propylene oxide and ethylene oxide and aminosilane at 80° C. The obtained mixture contains (hydroxyisopropyl)aminopropyltriethoxysilane and bis-(hydroxyisopropyl)aminopropyltriethoxysilane in different ratios. The end-cappers produced with this method contain different ratios of primary and secondary alcohols which points out the poor reaction selectivity.

EP 2852649 A1, EP 2832757 A1, and EP 2268650 A1 disclose polymers containing silane groups based on hydroxysilanes obtained by reacting lactides or unsubstituted or monosubstituted lactones with aminosilanes.

Another method for producing hydroxyl functional alkoxysilanes was described by Narayan et al. (Yuya Tachibana, Xiangke Shi, Daniel Graiver, Ramani Narayan, *Silicone,* 4, 167-174). Aminosilane was reacted with ethyl carbonate to produce the primary hydroxyl functionality. They reported that partial condensation was unavoidable even in the absence of any catalyst.

Therefore, a need still exists for providing hydroxyl functional alkoxysilanes which can overcome the stability issue.

The object of this invention is to provide a stable hydroxyl functional alkoxysilanes and a method for the preparation thereof.

It has been found that the tertiary hydroxyl functional alkoxysilanes having the general formula (I) according to the present invention are significantly less nucleophilic and are therefore considerably less reactive than the standard systems, allowing a better reaction control and a higher storage stability.

The present invention provides tertiary hydroxyl functional silanes having the general formula (I)

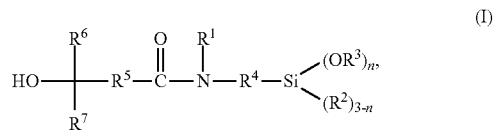

wherein
- $R^1$ is selected from the group consisting of hydrogen and a linear or branched, substituted or unsubstituted hydrocarbon residue having 1 to 20 carbon atoms;
- $R^2$ and $R^3$ are same or different and are, independent from one another, selected from a linear or branched, substituted or unsubstituted hydrocarbon residue having 1 to 20 carbon atoms;
- $R^4$ is selected from a linear or branched, substituted or unsubstituted hydrocarbon residue having 1 to 20 carbon atoms;
- $R^5$ is selected from a linear or branched, substituted or unsubstituted hydrocarbon residue having 1 to 20 carbon atoms;
- $R^6$ and $R^7$ are same or different and are, independent from one another, selected from a linear or branched, substituted or unsubstituted hydrocarbon residue having 1 to 20 carbon atoms; and
- n is 1, 2 or 3.

As used herein, the singular forms "a", "an" and "the" include plural referents unless the context clearly dictates otherwise.

The term "at least one," as used herein, means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

The terms "comprising" and "comprises" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

$R^1$ in the general formula (I) is selected from the group consisting of hydrogen and a linear or branched, substituted or unsubstituted hydrocarbon residue having 1 to 20 carbon atoms, preferably a $C_1$-$C_{20}$ alkyl or $C_6$-$C_{18}$ aryl residue, which may be interrupted by at least one heteroatom. In preferred embodiments, $R^1$ is hydrogen or selected from a $C_1$-$C_8$ alkyl residue, more preferably a methyl, ethyl or n-propyl residue, most preferably, $R^1$ is hydrogen.

$R^2$ and $R^3$ in the general formula (I) are same or different and are, independent from one another, selected from a linear or branched, substituted or unsubstituted hydrocarbon residue having 1 to 20 carbon atoms, preferably a $C_1$-$C_{20}$ alkyl or $C_6$-$C_{18}$ aryl residue, more preferably a $C_1$-$C_8$ alkyl residue, which may be interrupted by at least one heteroatom. Particularly preferably $R^2$ and $R^3$ in the general formula (I) are same or different and are, independent from one another, selected from a methyl, ethyl, or n-propyl residue, most preferably a methyl residue.

According to an embodiment of the present invention, $R^2$ is selected from a hydrocarbon residue having 1 to 20 carbon atoms, preferably a $C_1$-$C_{20}$ alkyl, wherein one or more carbon atom(s) are substituted with at least one heteroatoms, preferably selected from O or N. Preferably the carbon atom in alpha position to Si is substituted with O or N.

$R^4$ is selected from a linear or branched, substituted or unsubstituted hydrocarbon residue having 1 to 20 carbon atoms, preferably a $C_1$-$C_{20}$ alkylene, more preferably a $C_1$-$C_8$ alkylene residue, which may be interrupted by at least one heteroatom. $R^4$ is particularly preferably selected from a methylene, ethylene, 1,3-propylene, 2-methyl-1,3-propylene, 1,4-butylene, 3-methyl-1,4-butylene, or 3,3-dimethyl-1,4-butylene residue, most preferably 1,3-propylene residue.

$R^5$ is selected from a linear or branched, substituted or unsubstituted hydrocarbon residue having 1 to 20 carbon atoms, preferably a $C_1$-$C_{20}$ alkylene, more preferably a $C_1$-$C_8$ alkylene residue, which may be interrupted by at least one heteroatom. $R^5$ is particularly preferably selected from methylene, ethylene or 1,3-propylene, 2-methyl-1,3-propylene, 1,4-butylene, 3-methyl-1,4-butylene, or 3,3-dimethyl-1,4-butylene residue, most preferably ethylene or 1,3-propylene residue.

$R^6$ and $R^7$ are same or different and are, independent from one another, selected from a linear or branched, substituted or unsubstituted hydrocarbon residue having 1 to 20 carbon atoms, preferably a $C_1$-$C_{20}$ alkyl, alkenyl, or alkynyl, or $C_6$-$C_{18}$ aryl residue, more preferably a $C_1$-$C_8$ alkyl residue, particularly preferably a methyl, ethyl, or n-hexyl residue, or a $C_1$-$C_8$ alkenyl residue, which may be interrupted by at least one heteroatom.

n is 1, 2 or 3, preferably 2 or 3, more preferably 3.

The term "substituted hydrocarbon residue," as used in this connection, means that one or more carbon atoms and/or hydrogen atom(s) of the hydrocarbon residues are replaced by heteroatoms or functional groups. Heteroalkyl groups in which one or more carbon atoms are replaced by heteroatoms, particularly selected from O, S, N, and/or Si, are obtained by the replacement of one or more carbon atoms by heteroatoms. Examples of such heteroalkyl groups are, without limitation, methoxymethyl, ethoxyethyl, propoxypropyl, methoxyethyl, isopentoxypropyl, ethylaminoethyl, trimethoxypropylsilyl, etc. Functional groups that can replace the hydrogen atoms are selected particularly from =O, =S, —OH, —SH, —NH$_2$ —NO$_2$, —CN, —F, —Cl, —Br, —I, —OCN, —NCO, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms are independently nitrogen, oxygen, or sulfur.

As used herein, a "$C_1$-$C_{20}$ alkyl" or "$C_1$-$C_8$ alkyl" residue refers to a monovalent group that contains from 1 to 20 or from 1 to 8 carbons atoms, that is a radical of an alkane and includes linear and branched organic groups. Examples of alkyl residues include, but are not limited to: methyl; ethyl; propyl (or n-propyl); isopropyl; n-butyl; isobutyl; sec-butyl; tert-butyl; n-pentyl; n-hexyl; n-heptyl; and, 2-ethylhexyl. In the present invention, such alkyl residues may be unsubstituted or may be substituted with one or more substituents, such as halo, preferably fluoro or chloro, nitro, cyano, amido, amino, sulfonyl, sulfinyl, sulfanyl, sulfoxy, urea, thiourea, sulfamoyl, sulfamide and hydroxy, and may optionally be interrupted by at least one heteroatom. The halogenated derivatives of the exemplary hydrocarbon residues listed above may, in particular, be mentioned as examples of suitable substituted alkyl residues.

As used herein, a "$C_6$-$C_{18}$ aryl" residue is used alone or as part of a larger moiety—as in "aralkyl residue"—refers to optionally substituted, monocyclic, bicyclic and tricyclic ring systems in which the monocyclic ring system is aromatic or at least one of the rings in a bicyclic or tricyclic ring system is aromatic. The aryl residue may be optionally interrupted by at least one heteroatom. The bicyclic and tricyclic ring systems include benzofused 2-3 membered carbocyclic rings. Exemplary aryl residues include, but are not limited to: phenyl; indenyl; naphthalenyl, tetrahydronaphthyl, tetrahydroindenyl; tetrahydroanthracenyl; and, anthracenyl. A phenyl residue is preferred.

The term "alkenyl", as used herein, refers to an alkenyl residue which comprises at least two carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl residues can be substituted or unsubstituted. If they are substituted, the substituents are as defined above. The alkenyl residue comprises linear or branched hydrocarbon chains.

The term "alkynyl," as used herein, refers to an alkynyl residue which comprises at least two carbon atoms and at least one carbon-carbon triple bond, e.g., ethynyl (acetylene), propynyl, or butynyl, and structural isomers thereof as described above. Alkynyl residues can be substituted or unsubstituted. If they are substituted, the substituents are as defined above.

The term "$C_1$-$C_{20}$ alkylene" or "$C_1$-$C_8$ alkylene" residue refers to a divalent group that contains from 1 to 20 or 1 to 8 carbon atoms, that is a radical of an alkane and includes linear, branched organic or cyclic groups, which groups may be unsubstituted or substituted and may optionally be interrupted by at least one heteroatom. In general, a preference for alkylene groups containing from 1-20 carbon atoms ($C_1$-$C_{20}$ alkylene)—for example substituted, unsubstituted, interrupted or un-interrupted alkylene groups containing from 1 to 8 carbon atoms ($C_1$-$C_8$ alkylene)—should be noted. Where the term "$C_1$-$C_8$ alkylene group" is used to define the component A herein, it is particularly preferred for said alkylene group to be uninterrupted.

Where mentioned, the expression "interrupted by at least one heteroatom" means that the main chain of a residue comprises, as a chain member, at least one atom that differs from carbon atom, preferably oxygen, sulfur, fluorine, nitrogen, or chloride.

The present invention further provides a method for preparing the tertiary hydroxyl functional silane having the general formula (I) as defined herein, comprising reacting at least one di-substituted lactone compound and at least one aminosilane having at least one primary or secondary amino group. The tertiary hydroxyl functional silane having the general formula (I) is obtained by ring opening of di-substituted lactone(s) with aminosilane(s).

In preferred embodiments, the di-substituted lactone has the general formula (II)

(II)

wherein $R^5$, $R^6$ and $R^7$ are the same as defined for the general formula (I) above.

In preferred embodiments, the aminosilane is an aminoalkylenealkoxysilane having the general formula (III)

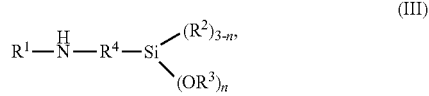

(III)

wherein $R^1$ to $R^4$ and n are the same as defined for the general formula (I) above.

Preferably, the aminoalkylenealkoxysilane is selected from the group consisting of gamma-aminopropyltrimethoxysilane, gamma-aminopropyltriethoxysilane, gamma-aminopropylmethyldiethoxysilane, gamma-aminopropylmethyldimethoxysilane, gamma-aminopropyltriisopropoxysilane, gamma-aminopropylmethyldiisopropoxysilane, alpha-aminomethyltriethoxysilane, alpha-aminomethyltrimethoxysilane, alpha-am inomethyldiethoxymethylsilane, alpha-aminomethyldimethoxymethylsilane, alpha-aminomethyltriisopropoxysilane, alpha-aminomethyldiisopropoxymethylsilane gamma-aminopropylsilanetriol, gamma-aminopropylmethylsilanediol, gamma-(2-aminoethyl)aminopropylsilanetriol, gamma-(2-aminoethyl)aminopropyltrimethoxysilane, gamma-(2-aminoethyl)aminopropylmethyldimethoxysilane, gamma-(2aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, gamma-(6-aminohexyl)aminopropyltrimethoxysilane, gamma-(2-aminoethyl)aminopropyltriisopropoxy, gamma-(2-aminoethyl)aminopropylmethyldiisopropoxy, gamma-(N-ethylamino)-2-methylpropyltrimethoxysilane, N-phenyl-gamma-aminopropylmethyldimethoxysilane, N-benzyl-gamma-aminopropyltrimethoxysilane, N-benzyl-gamma-aminopropyltriethoxysilane, N-benzyl-gamma-aminopropylmethyldimethoxysilane, N-vinylbenzyl-gamma-aminopropyltriethoxysilane, N-methyl-gamma-aminopropyltriethoxysilane, N-methyl-gamma-aminopropylmethyldimethoxysilane, N-methyl-gamma-aminopropyltrimethoxysilane, N-ethyl-gamma-aminopropyltriethoxysilane, N-ethyl-gamma-aminopropylmethyldimethoxysilane, N-ethyl-gamma-aminopropyltrimethoxysilane, N-propyl-gamma-aminopropyltriethoxysilane, N-propyl-gamma-aminopropylmethyldimethoxysilane, N-propyl-gamma-aminopropyltrimethoxysilane, N-butyl-gamma-aminopropyltriethoxysilane, N-butyl-gamma-aminopropylmethyldimethoxysilane, N-butyl-gamma-aminopropyltrimethoxysilane, N-cyclohexylaminomethyltriethoxysilane, N-cyclohexylaminomethyltriethoxysilane, N-cyclohexylaminomethyltrimethoxysilane, N-cyclohexylaminomethylmethyldiiethoxysilane, N-cyclohexylaminomethyldiethoxymethylsilane, N-phenylaminomethyltrimethoxysilane, (2-aminoethyl)aminomethyltrimethoxysilane, N,NLbis[3-(trimethoxysilyl)propyl] ethylenediamine, delta-aminoneohexyltrimethoxysilane, N-beta-(aminoethyl)-gamma-aminopropylmethyldimethoxysilane and deltaaminoneohexylmethyldimethoxysilane, or mixtures thereof.

Synthesis of hydroxyl functional silane having the general formula (I) can be conducted at a broad range of temperatures, e.g., from −50 to 200° C., preferably −10 to 180° C., more preferably 23 to 100° C., most preferably 30 to 60° C. The reaction is performed preferably under argon or nitrogen atmosphere.

In preferred embodiments, the molar ratio of the di-substituted lactone compound reaction and the aminosilane is from 0.8 to 1.3, more preferably from 1 to 1.2. If the lactone compound is added in excess, the unreacted lactone compounds are removed after the reaction using a vacuum or remain in the final product as a mixture.

The reaction can be carried out in the presence of a catalyst in order to increase the reaction rates. The catalyst can be selected from a Lewis acid, preferably a metal-containing compound or a Main group derivative, more preferably organoaluminium compound, such as triethylaluminium.

The catalyst can be added from 0.001 to 5 mol %, preferably from 0.01 to 3 mol %, more preferably from 0.5 to 2 mol %, relative to the mol % of the amine functionality of the aminoalkoxysilane.

The reaction can be conducted with or without a solvent. Preferable solvents are water-free polar solvents like toluene, acetonitrile, tetrahydrofuran, ethylene glycol, dimethyl ether, diethyl ether, benzene, ethyl acetate, propylene carbonate, ethylene carbonate, isopropanol, butanol, ethylene glycol, n-propanol, ethanol, methanol, chloroform, chloromethane, preferably in dichloromethane. Before the product is used, for example, for preparation of curable compositions, it is preferable to remove the solvent by distillation.

Reaction time can vary from 0.5 to 12 hours, preferably from 1 to 5 hours, more preferably from 1 to 3 hours.

The above-defined method has been found to produce the hydroxyl functional alkoxysilane of the general formula (I) at high yields in a one-step reaction at mild conditions. The method according to the present invention is energy-efficient, since no purification of the product is needed; therefore the amount of produced waste is minimized.

The present invention further relates to the use of the tertiary hydroxyl functional alkoxysilane of the general formula (I) as defined herein as an adhesion promoter, urethane coupling agent, end-capping agent (also called "endcappers") for moisture-curable compositions, surface treatment agent, water scavenger, fiber treatment agent, paint additive, and/or a monomer for polymer preparations.

In principle in the present invention, all features listed within the context of the present text, particularly the embodiments, proportional ranges, components and other features of the composition according to the invention, of the method according to the invention and of the use according to the invention identified as preferred and/or special, can be implemented in all possible and not mutually exclusive combinations, with combinations of features identified as preferred and/or special also being regarded as preferred and/or special.

The following examples are used to explain the invention; however, the invention is not limited thereto.

EXAMPLES

Examples 1 to 3

Preparation of Tertiary Hydroxyl Functional Methoxysilanes

In a dry round bottom flask under argon atmosphere 5 g (27.9 mmol) of (3-aminopropyl)trimethoxysilane (AMMO) was stirred at 50° C. 0.28 ml of 1M triethylaluminium solution in hexane was slowly added (0.279 mmol, 1 mol %). Afterwards 27.9 mmol of the di-substituted lactone listed in Table 1 was added and vigorously stirred for 3 hours. The following compounds were obtained as colorless liquids in 96-98% purity.

Example 1

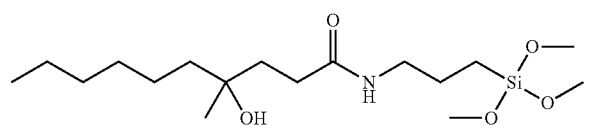

$^1$H NMR (400 MHz, Chloroform-d) δ 6.44 (s, 1H), 3.54 (s, 4H), 3.18 (q, J=7.0, Hz, 1H), 2.28 (t, J=7.5, Hz, 1H), 1.82-1.65 (m, 1H), 1.63-1.52 (m, 1H), 1.45-1.38 (m, 1H), 1.25 (s, 3H), 1.11 (s, 2H), 0.85 (t, J=1.3 Hz, 1H), 0.66-0.57 (m, 1H); $^{13}$C NMR (101 MHz, CDCl$_3$) δ=174.13, 71.51, 50.46, 42.54, 41.93, 36.69, 31.81, 29.89, 26.47, 23.99, 22.63, 22.57, 14.00, 6.46; $^{29}$Si NMR (79 MHz, CDCl$_3$) δ=−42.27.

Example 2

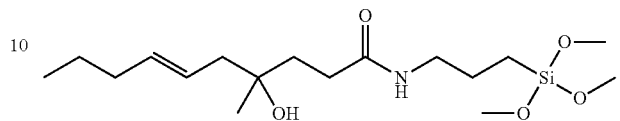

$^1$H NMR (400 MHz, Chloroform-d) δ 6.51 (s, 0H), 5.22 (qd, J=6.1, 1.7 Hz, 1H), 3.45 (s, 4H), 3.11 (q, J=7.0, Hz, 1H), 2.21 (dd, J=6.2, 3.8 Hz, 1H), 2.04-1.85 (m, 2H), 1.77-1.56 (m, 1H), 1.55-1.44 (m, 1H), 1.39 (dt, J=11.2, 4.2 Hz, 1H), 1.05 (d, J=1.9 Hz, 1H), 0.84 (td, J=7.5, 2.1 Hz, 1H), 0.53 (m, 1H); $^{13}$C NMR (101 MHz, CDCl$_3$) δ=174.12, 131.54, 128.91, 71.30, 50.39, 42.36, 41.92, 36.76, 30.93, 26.25, 22.60, 21.81, 20.37, 14.22, 6.43; $^{29}$Si NMR (79 MHz, CDCl$_3$) δ=−42.28.

Example 3

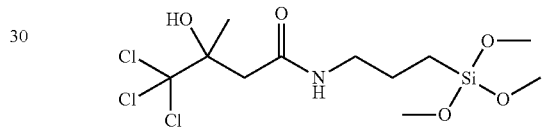

$^1$H NMR (400 MHz, Chloroform-d) δ 6.83 (s, 0H), 3.57 (s, 6H), 3.31-3.19 (m, 1H), 3.04-2.59 (m, 1H), 1.71-1.59 (m, 3H), 0.70-0.61 (m, 1H); $^{13}$C NMR (101 MHz, CDCl$_3$) δ=171.16, 107.83, 81.59, 50.61, 41.97, 40.80, 23.35, 22.41, 6.56; $^{29}$Si NMR (79 MHz, CDCl$_3$) δ=−42.48.

Comparative Examples 1 and 2

Preparation of Secondary Hydroxyl Functional Methoxysilanes

In a dry round bottom flask under argon atmosphere 5 g (27.9 mmol) of (3-aminopropyl)trimethoxysilane (AMMO) was stirred at 50° C. 0.28 ml of 1M triethylaluminium solution in hexane was slowly added (0.279 mmol, 1 mol %). Afterwards 27.9 mmol of the mono-substituted lactone listed in Table 1 was added and vigorously stirred for 3 hours.

A yellowish and viscous following product from Comparative Example 1 was obtained.

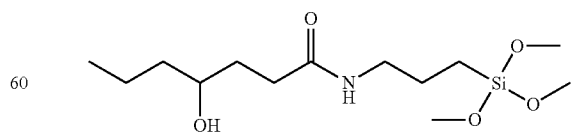

$^1$H NMR (400 MHz, Chloroform-d) δ6.55 (s, 0H), 3.51 (s, 5H), 3.19-3.12 (m, 1H), 2.32-2.26 (m, 1H), 1.84-1.71 (m, 1H), 1.65-1.49 (m, 2H), 1.37 (m, 2H), 0.86 (t, J=7.0 Hz, 1H), 0.63-0.55 (m, 1H); $^{13}$C NMR (101 MHz, CDCl$_3$) δ=173.95, 70.74, 50.46, 41.92, 39.78, 33.10, 32.81, 22.62, 18.86, 14.03, 6.45; $^{29}$Si NMR (79 MHz, CDCl$_3$) δ=−42.22.

The NMR of the product from Comparative Example 2 showed a highly crosslinked structure, which cannot be used further.

Comparative Example 3

Preparation of Primary Hydroxyl Functional Methoxysilane

In a dry round bottom flask under argon atmosphere 5 g (27.9 mmol) of (3-aminopropyl)trimethoxysilane (AMMO) was stirred at 50° C. 0.28 ml of 1M triethylaluminium solution in hexane was slowly added (0.279 mmol, 1 mol %). Afterwards 27.9 mmol of δ-valerolactone was added and vigorously stirred for 3 hours. A yellow highly viscous product was obtained. The NMR of the product of Comparative Example 3 showed a highly crosslinked structure, which cannot be used further.

Testing the Stability of Prepared Silanes

After the preparation of the hydroxyl functional silanes as described above, a round bottom flask with the sample under the nitrogen atmosphere was placed in the heating oven at 50° C. for 8 days. A small amount of sample for the NMR analysis was withdrawn from the flask immediately before putting it the oven and after 2, 5 and 8 days. The degree of crosslinking and consequently the purity was assessed based the integration of the $^{29}$Si NMR spectra. The peak at around −42 ppm corresponded to the non-hydrolyzed trimethoxysilane, the peak at around −41 ppm corresponded to self-dealcoholized product and the peaks below the value of −44 ppm correspond to the mono-, di- or three-hydrolyzed (oligomerized or crosslinked) silane. It was determined that only the silanes with purity higher than 90% after 8 days at 50° C. suffice the standards for further applications.

TABLE 1

Purity comparison of the hydroxyl functional silanes

|  | Lactone | Purity (%) | | | |
|---|---|---|---|---|---|
|  |  | Right after reaction | 2 days | 5 days | 8 days |
| Example 1 | 4-methyl decalactone | 98 | 98 | 98 | 97 |
| Example 2 | 4-hydroxyl-4-methyl-7-cis-decene gamma lactone | 96 | 95 | 94 | 92 |
| Example 3 | 4-methyl-4-(trichloromethyl)-2-oxetanone | 97 | 94 | 93 | 91 |
| Comp. Example 1 | gamma-heptalactone | 92 | 88 | 85 | 82 |
| Comp. Example 2 | gamma-valerolactone | Completely crosslinked | | | |
| Comp. Example 3 | delta-valerolactone | Completely crosslinked | | | |

The invention claimed is:

1. A method for preparing a tertiary hydroxyl functional alkoxysilane of the general formula (I)

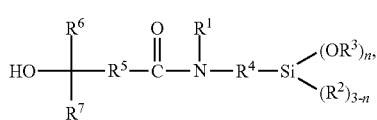

(I)

wherein
R$^1$ is selected from the group consisting of hydrogen and a linear or branched, substituted or unsubstituted, hydrocarbon residue having 1 to 20 carbon atoms;
R$^2$ and R$^3$ are same or different and are, independent from one another, selected from a linear or branched, substituted or unsubstituted, hydrocarbon residue having 1 to 20 carbon atoms;
R$^4$ is selected from a linear or branched, substituted or unsubstituted, hydrocarbon residue having 1 to 20 carbon atoms;
R$^5$ is selected from a linear or branched, substituted or unsubstituted, hydrocarbon residue having 1 to 20 carbon atoms;
R$^6$ and R$^7$ are same or different and are, independent from one another, selected from a linear or branched, substituted or unsubstituted, hydrocarbon residue having 1 to 20 carbon atoms; and
n is 1, 2 or 3; comprising:
providing at least one di-substituted lactone compound;
providing at least one aminosilane having at least one primary amino group or secondary amino group;
providing a Lewis acid catalyst; and
reacting the at least one di-substituted lactone compound and the at least one aminosilane having at least one primary amino group or secondary amino group in the presence of the Lewis acid catalyst.

2. The method according to claim 1, wherein the di-substituted lactone compound has the general formula (II)

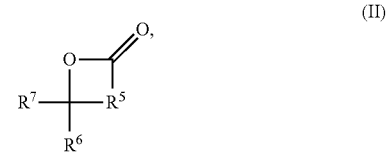

(II)

wherein
R$^5$ is selected from a linear or branched, substituted or unsubstituted, hydrocarbon residue having 1 to 20 carbon atoms; and
R$^6$ and R$^7$ are same or different and are, independent from one another, selected from a linear or branched, substituted or unsubstituted, hydrocarbon residue having 1 to 20 carbon atoms.

3. The method according to claim 1, wherein the aminosilane is an aminoalkylenealkoxysilane having the general formula (III)

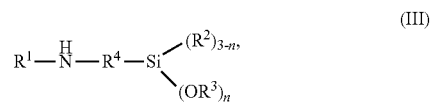

(III)

wherein
R$^1$ is selected from the group consisting of hydrogen and a linear or branched, substituted or unsubstituted, hydrocarbon residue having 1 to 20 carbon atoms;
R$^2$ and R$^3$ are same or different and are, independent from one another, selected from a linear or branched, substituted or unsubstituted, hydrocarbon residue having 1 to 20 carbon atoms; and
R$^4$ is selected from a linear or branched, substituted or unsubstituted, hydrocarbon residue having 1 to 20 carbon atoms.

4. The method according to claim 1, wherein $R^1$ is selected from hydrogen or a $C_1$-$C_8$ alkyl residue.

5. The method according to claim 1, wherein $R^2$ and $R^3$ are selected from a linear or branched, substituted or unsubstituted $C_1$-$C_8$ alkyl residue and n is 2 or 3.

6. The method according to claim 1, wherein $R^2$ and $R^3$ are selected from a linear or branched, substituted or unsubstituted methyl, ethyl, or n-propyl residue.

7. The method according to claim 1, wherein $R^2$ is a $C_1$-$C_{20}$ alkyl, one or more carbon atom(s) are substituted with at least one heteroatom selected from O or N, and the carbon atom in alpha position to Si is substituted with O or N.

8. The method according to claim 1, wherein $R^4$ is selected from a linear or branched, substituted or unsubstituted $C_1$-$C_8$ alkylene residue.

9. The method according to claim 1, wherein $R^4$ is selected from a linear or branched, substituted or unsubstituted methylene, ethylene, 1,3-propylene, 2-methyl-1,3-propylene, 1,4-butylene, 3-methyl-1,4-butylene, or 3,3-dimethyl-1,4-butylene residue.

10. The method according to claim 1, wherein $R^5$ is a linear or branched, substituted or unsubstituted, alkylene residue having 1 to 20 carbon atoms.

11. The method according to claim 1, wherein $R^5$ is selected from methylene, ethylene or 1,3-propylene, 2-methyl-1,3-propylene, 1,4-butylene, 3-methyl-1,4-butylene, or 3,3-dimethyl-1,4-butylene residue.

12. The method according to claim 1, wherein $R^6$ and $R^7$ are independent from one another selected from a linear or branched, substituted or unsubstituted $C_1$-$C_{20}$ alkyl, alkenyl, or alkynyl, or $C_6$-$C_{18}$ aryl residue.

13. The method according to claim 1, wherein $R^6$ and $R^7$ are independent from one another selected from a linear or branched, substituted or unsubstituted $C_1$-$C_8$ alkyl or alkenyl residue.

14. The method according to claim 1, wherein the catalyst is present in an amount of from 0.01 to 5 mol. % based on the moles of amine functionality of the aminoalkoxysilane.

15. The method according to claim 1, wherein the Lewis acid catalyst is a Lewis-acidic organoaluminium compound.

16. The method according to claim 1, wherein the Lewis acid catalyst is triethylaluminium.

17. The method according to claim 1, further comprising a step of heating the at least one di-substituted lactone compound and the at least one aminosilane having at least one primary amino group or secondary amino group and the Lewis acid to a temperature in the range of from −50 to 200° C. during the reaction.

* * * * *